United States Patent [19]

Taylor, III

[11] 3,966,101

[45] June 29, 1976

[54] CAMERA SUPPORT

[76] Inventor: William P. Taylor, III, 963 Renwood Drive, Kettering, Ohio 45429

[22] Filed: Dec. 5, 1974

[21] Appl. No.: 529,626

[52] U.S. Cl. ............................ 224/28 R; 224/5 V; 354/82; 354/293
[51] Int. Cl.² ...................... A44C 5/00; G03B 17/00
[58] Field of Search ...................... 354/82, 81, 293; 352/243; 224/5 V, 28 R, 45 R, 25 R

[56] References Cited
UNITED STATES PATENTS

| | | | |
|---|---|---|---|
| 1,691,733 | 11/1928 | Nordin | 354/81 |
| 2,771,014 | 11/1956 | Tolcher | 354/293 X |
| 3,060,625 | 10/1962 | Glass et al. | 224/28 R X |

Primary Examiner—John F. Gonzales
Attorney, Agent, or Firm—Biebel, French & Nauman

[57] ABSTRACT

A camera support includes an arm engaging section which is attached to and embraces the forearm of one using the support and a base to which a camera is attached and which projects outwardly from the arm engaging section. Persons having the use of only one hand can operate a camera mounted on the support since it is unnecessary for them to hold the camera manualy and they can, therefore, use their hand to manipulate the camera controls, while persons having the use of both hands will have both hands free. Aside from eliminating the necessity of holding the camera, the support steadies the camera and is particularly helpful in this regard when using attachments such as a telephoto lens, which are usually somewhat awkward to handle.

11 Claims, 7 Drawing Figures

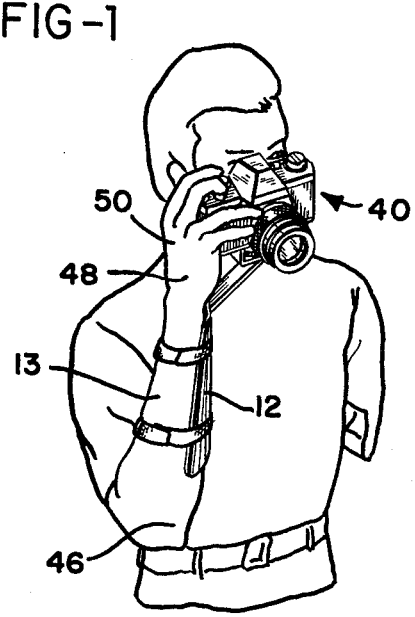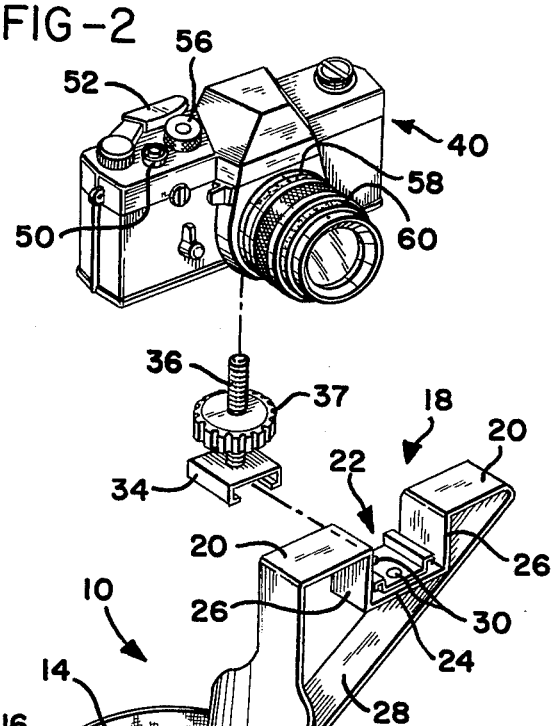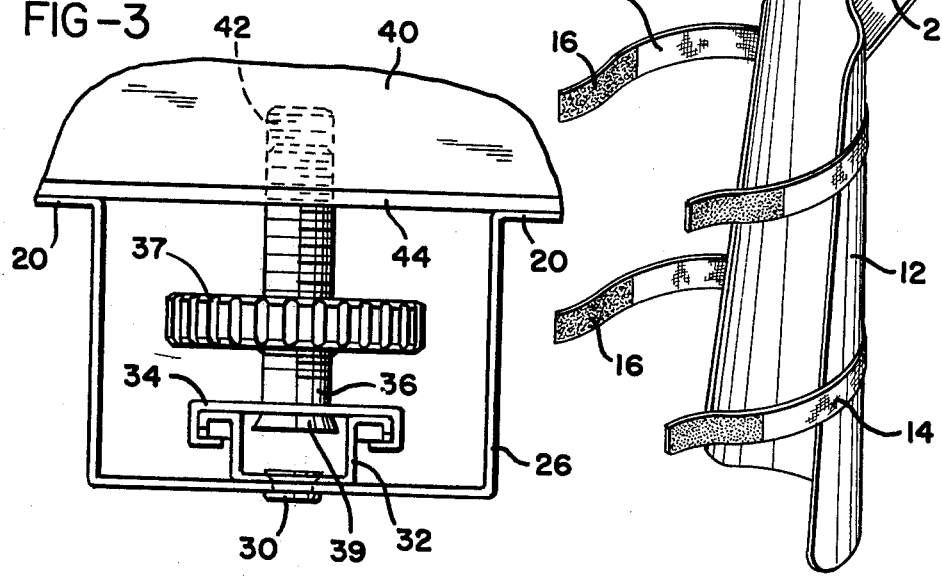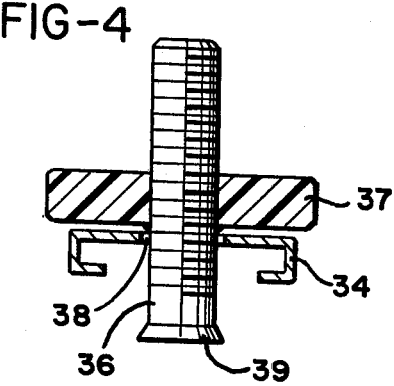

CAMERA SUPPORT

BACKGROUND OF THE INVENTION

It is often desirable to provide support for a camera, particularly when using slower shutter speeds. While camera tripods are used conventionally for this purpose and most cameras are provided with a threaded socket in thier base for this purpose, it is often inconvenient to use a tripod.

A number of alternate camera supports have been proposed, with many using a portion of the body to enhance the stability of the camera. Many of these utilize a harness of some type, as shown, for example, in U.S. Pat. Nos. 2,370,611; 2,771,826 and 2,952,200. Others provide an additional steadying handle as shown, for example, in U.S. Pat. No. 2,771,014. Still others depend upon contact with the mouth or face of one using the support, as seen, for example, in U.S. Pat. Nos. 2,651,981 and 2,826,978, respectively.

In addition to the problem of providing a steady rest for a camera, an additional problem presents itself where the cameraman has the use of only one hand. Thus, most cameras are intended to be operated with the camera held mainly by the left hand while the controls are manipulated by the right hand. Obviously, where a person has the use of only one hand, as in the case of an amputee, it is at least difficult, if not impossible, for a person so handicapped to use a camera without resource to a conventional tripod or the like and, as noted above, in many instances it is inconvenient and impractical to use a conventional tripod.

SUMMARY OF THE INVENTION

The present invention provides a body attached camera support which not only provides a steady rest for a camera mounted on the support but also premits those having the use of only one hand to operate a conventional camera.

The support includes an arm engaging portion which is adapted to extend along the forearm of one using the support and be held in embracing contact therewith with any convenient fastening means. Since the forearm is jointless and the arm engaging section is held immobile with respect to the forearm, a steady rest is provided to which a camera supporting base can be attached. It is unnecessary, therefore, to rely upon the muscles controlling the wrist, for example, for support as is usually the case. Additionally, since the camera is carried by the forearm, the hand is free to manipulate the controls.

It will be seen, therefore, that not only does the camera support of the present invention provide a stable base and permit a person having the use of only one hand to operate a camera without resort to a tripod, but it also facilitates camera operation by a person having the use of both hands.

A further advantage of the camera support of the present invention is that it provides greater leverage when using a camera having an attachment such as a telephoto lens, which projects outwardly a substantial distance from the front of the camera. Ordinarily when using a telephoto lens the outer end of the attachment is held in the left hand and the camera in the right. The tendency of the camera to twist downwardly out of the right hand is resisted by the muscles controlling the right wrist and other muscles of both arms. Obviously, by relieving the right wrist of the effort to steady the camera the stability of the camera is greatly improved and the camera controls become much easier to manipulate.

Thus, as will be apparent from the detailed description below, the present invention provides a camera support which not only offers marked advantages to persons having the use of both hands but facilitates camera operation by handicapped persons having use of only one hand.

BRIEF DESCRIPTION OF THE DRAWINGS

FIG. 1 is a view showing a camera support in accordance with one embodiment of the invention in use by a person having the use of only the right hand;

FIG. 2 is an exploded perspective view showing the camera support of FIG. 1 and a camera associated therewith;

FIG. 3 is an enlarged view of the camera mounting attachment;

FIG. 4 is an enlarged view of a portion of the mounting shown in FIG. 3;

DESCRIPTION OF THE PREFERRED EMBODIMENTS

Figure 5:
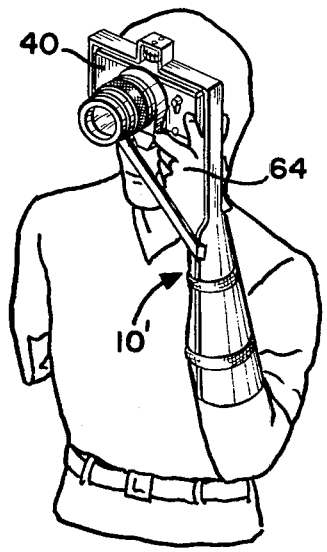
FIG. 5 is a view similar to FIG. 1, but showing a second preferred embodiment designed for persons having the use of only their left hand.

With reference initially to FIGS. 1 and 2 of the drawings, it will be seen that a camera support 10 in accordance with the present invention includes a shell-like, semi-cylindrical portion 12 adapted to extend along and embrace a portion of the forearm 13 of one using the support, as seen in FIG. 1 of the drawings.

The arm engaging section 12 may be provided with elastic straps 14 and any convenient connectors 16, which may be of the type sold under the trademark VELCRO. This construction permits some adjustment to accommodate arms of different thickness while the elastic permits, for example, a one armed person to insert his forearm into the support after the straps have been adjusted. Alternately, of course, a simple elastic sleeve or any convenient fastener could be used for holding the arm engaging section 12 in firm contact with the forearm of one using the support.

Projecting outwardly at substantially right angles to the arm engaging section 12 is a camera supporting base 18 which includes two outer sections 20 joined by a U-shaped section 22 which includes a central bight portion 24 and opposed, substantially parallel legs 26. For increased rigidity a brace 28 extends angularly upwardly and outwardly from the arm engaging section 12 to the outer end of the camera supporting base 18.

Attached to the bight portion 24, as best seen in FIGS. 2 and 3 of the drawings, by means of rivets 30 or the like is a lower mounting foot 32 adapted to be slidably received in a complementary upper mounting foot 34. The feet 33 and 34 may be of conventional design and are commercially available.

A threaded shaft 36 is, as best seen in FIG. 4, rotatably received in the upper foot 34 and has fixed thereto a knurled thumb wheel or knob 37. The threaded shaft 36 is complementary to the threaded sockets usually found in the base of most cameras and is retained in an opening 38 in foot 34 by means of the knob 37 and a head 39.

To attach a camera 40 to the support 10, the end of the shaft 36 is threaded a short distance into the socket 42 thereof and the feet 34 and 32 slid into engagement with each other. The knob 37 is then rotated to draw the base 44 of the camera down tightly onto the outer sections 20 of the camera supporting base 18.

With the camera support attached to the forearm 13 of one using the support, as shown in FIG. 1 of the drawings, it will be seen that the arm engaging section 12 extends from adjacent the elbow 46 to adjacent the wrist 48 and that the hand 50 lies outwardly of the upper end of the arm engaging section 12.

As a result, the various standard camera controls, as can be seen in FIG. 2 of the drawings, such as a film advancing lever 52, shutter release button 54, shutter speed knob 56, f/ stop or aperture control 58, focus control 60, etc., are accessible to the right hand 52 of the person using the camera support.

In addition to permitting a person having the use of both hands to have both hands free, since it us unnecessary to hold the camera with the left hand, it will be apparent that one having the use of only one hand can operate a camera with little or no inconvenience. Aside from these features it will be seen that with the camera mounted on the forearm a highly stable rest is provided.

When utilizing an attachment such as a telephoto lens, which tends to twist the camera downwardly due to the substantial distance the attachment projects outwardly from the front of the camera, the support of the present invention may also be used to great advantage. Thus, as will be apparent from FIG. 7 of the drawings, where a telephoto lens 62 is utilized the twisting moment imparted to the camera by the weight of the lens, which is ordinarily resisted by the right wrist muscles and other muscles of the left and right arms, is now resisted additionally by the rigid forearm which provides greatly increased leverage against the twisting moment. Additonally, the elbow of the arm to which the camera support is attached can be pressed into the side of the body to further enhance the overall stability attained with the camera support.

Figure 7:
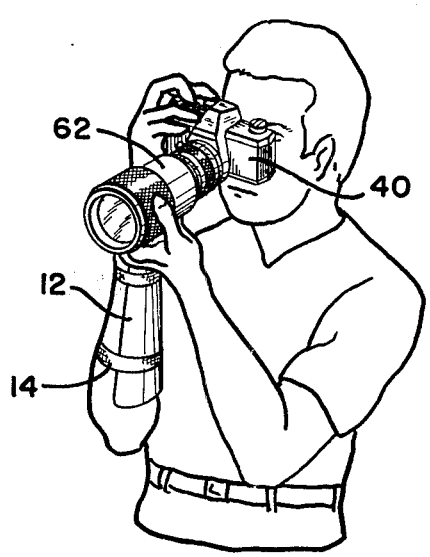
FIG. 7 is a view similar to FIGS. 1 and 5 but showing an embodiment of the invention utilized to support a camera having a telephoto lens.

In those situations where a person has the use of only their left, as opposed to their right hand, or where a person prefers to use their left rather than their right hand to operate the camera controls, a modification of the camera support shown in FIGS. 1, 2 and 7 of the drawings may be utilized which permits the camera to be inverted so that the camera controls are available from the left side rather than the right.

Figure 6:
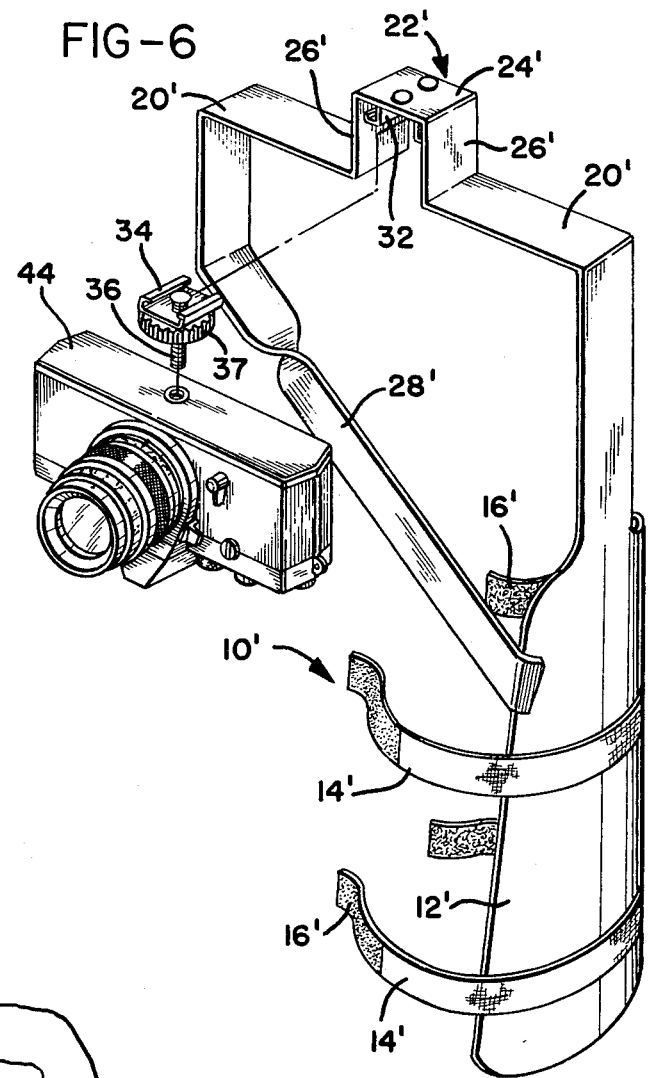
FIG. 6 is an exploded perspective view of the embodiment of FIG. 5.

As seen in FIGS. 5 and 6 of the drawings, an arm engaging section 12' is provided with attachment means 14' which, similarly to the straps 14 may be elastic and provided with fasteners 16. A camera supporting base 18' includes a U-shaped section 22' having a central bight portion 24' and opposed legs 26' flanked by outer sections 20'. Additionally, a brace member 28' may be provided for increased rigidity extending upwardly and outwardly from the section 12' to the camera supporting base 18'.

An attachment identical to that shown in FIG. 3 of the drawings, may be utilized with the embodiment of FIGS. 5 and 6 and the camera attached to the camera supporting base in substantially the same manner as the camera is attached to the base 18 except that as the knob 37 is turned to advance the shaft 36 into the socket 42, the base 44 of the camera is drawn up against the under surfaces of the sections 20'.

It will be noted from FIG. 5 of the drawings that the camera support 10' is attached to the outside of the left forearm with the camera supporting base extending outwardly from the arm engaging section 12' above the left hand 64. This places the camera controls within easy reach of the left hand of the person using the camera and, as in the embodiment shown in FIG. 1 of the drawings, provides a stable support for the camera.

While the forms of apparatus herein described constitute preferred embodiments of the invention, it is to be understood that the invention is not limited to these precise forms of apparatus, and that changes may be made therein without departing from the scope of the invention.

What is claimed is:

1. A camera support comprising:
   a. substantially rigid arm engaging means including a section having an appreciably greater length than width to permit said arm engaging means to extend along and engage at more than a single point portions of the forearm of one using said support,
   b. means for wrapping at more than a single point the forearm along which said arm engaging means extends,
   c. said arm wrapping means being secured to said arm engaging means and thereby rendering substantially immobile said arm engaging means with respect to the forearm along which it extends,
   d. a camera supporting base projecting outwardly from said arm engaging means at a position such that it is adjacent a hand associated with the forearm to which said arm engaging means is attached, and
   e. means on said camera supporting base for mounting a camera thereon in a position to be operated by the hand associated with the forearm to which said arm engaging means is attached.

2. The support of claim 1 wherein:
   a. said arm engaging means includes a substantially semi-cylindrical section.

3. The support of claim 1 wherein:
   a. said arm engaging means includes a shell-like member adapted to extend along the forearm of a person using said supporting form adjacent the elbow to adjacent the wrist.

4. The support of claim 1 wherein: said arm wrapping means comprises resilient means cooperating with said arm engaging means to embrace the forearm of one using said support.

5. The support of claim 1 wherein:
   a. said base includes a U-shaped section having a bight portion and opposing legs, and
   b. said camera mounting means is received within said U-shaped section and attached to said bight portion thereof.

6. The support of claim 5 wherein said camera mounting means comprises:
   a. a screw threaded shaft adapted to be received in a tripod socket on a camera,
   b. a knob fixed to said shaft for turning said shaft and thereby threading said shaft into and out of a tripod socket of a camera, and
   c. means rotatably mounting said shaft on said bight portion of said U-shaped section.

7. The support of claim 1 wherein:

a. said arm engaging means is adapted to engage the inside of a right forearm with said camera supporting base disposed inwardly of the right hand.

8. The support of claim 1 wherein:
a. said arm engaging means is adapted to engage the outside of a left forearm of one using said support with said camera supporting base disposed outwardly of the left hand.

9. A camera support base comprising:
a. a semi-cylindrical, shell-like arm engaging section adapted to extend along a substantial portion of a forearm from adjacent the elbow to adjacent the wrist of one using said support,
b. a plurality of resilient, detachable straps secured to said arm engaging section and adapted to cooperate with said arm engaging section to embrace the forearm of one using said support and hold said arm engaging section substantially immobile with respect to the forearm to which it is attached,
c. a camera supporting base projecting at substantially right angles outwardly from said arm engaging section rigidly with respect thereto,
d. bracing means extending from an outer end of said camera supporting base to said arm engaging section,
e. said camera supporting base including a substantially U-shaped section having a bight portion and opposed substantially parallel legs,
f. a first connecting member fixed to said bight portion of said U-shaped section,
g. a second connecting member complementary to and engageable with said first connecting member in engagement with said first connecting member,
h. a threaded shaft rotatably received within said second connecting member, and
i. a thumb wheel fixed to said shaft for rotating said shaft and threading it into or out of a tripod socket of a camera.

10. The support of claim 9 wherein:
a. said arm engaging section is adapted to engage the inside of a forearm with said supporting base disposed inwardly of the hand of one using said support, and
b. said U-shaped section projects inwardly toward said arm engaging section.

11. The support of claim 9 wherein:
a. said arm engaging section is adapted to engage the outside of a forearm with said camera supporting base disposed outwardly of the hand of one using said support, and
b. said U-shaped section projects outwardly away from said arm engaging section.

* * * * *